United States Patent
Edlin et al.

(10) Patent No.: US 11,721,352 B2
(45) Date of Patent: Aug. 8, 2023

(54) SYSTEMS AND METHODS FOR AUDIO CAPTURE

(71) Applicant: Dotterel Technologies Limited, Auckland (NZ)

(72) Inventors: Shaun Michael Edlin, Auckland (NZ); Shaun Taggart Pentecost, Auckland (NZ)

(73) Assignee: Dotterel Technologies Limited, Auckland (NZ)

( * ) Notice: Subject to any disclaimer, the term of this patent is extended or adjusted under 35 U.S.C. 154(b) by 32 days.

(21) Appl. No.: 17/055,976

(22) PCT Filed: May 15, 2019

(86) PCT No.: PCT/NZ2019/050053
§ 371 (c)(1),
(2) Date: Nov. 16, 2020

(87) PCT Pub. No.: WO2019/221613
PCT Pub. Date: Nov. 21, 2019

(65) Prior Publication Data
US 2021/0256987 A1   Aug. 19, 2021

(30) Foreign Application Priority Data
May 16, 2018   (NZ) ........................................ 742606

(51) Int. Cl.
*G10L 21/0232* (2013.01)
*G10K 11/175* (2006.01)
(Continued)

(52) U.S. Cl.
CPC ........ *G10L 21/0232* (2013.01); *B64C 39/024* (2013.01); *G10K 11/175* (2013.01); *G10L 25/21* (2013.01); *G10L 25/57* (2013.01); *H04R 1/406* (2013.01); *H04R 3/005* (2013.01); *H04R 19/04* (2013.01); *B64U 2101/00* (2023.01);
(Continued)

(58) Field of Classification Search
None
See application file for complete search history.

(56) References Cited

U.S. PATENT DOCUMENTS

| | | |
|---|---|---|
| 2,988,302 A | 6/1961 | Smith |
| 3,890,060 A | 6/1975 | Lipstein |

(Continued)

FOREIGN PATENT DOCUMENTS

| | | |
|---|---|---|
| CN | 2361699 Y | 2/2000 |
| CN | 101934858 A | 1/2011 |

(Continued)

OTHER PUBLICATIONS

"Fundamentals of Digital Array Processing"—Dan E. Dudgeon.
(Continued)

*Primary Examiner* — Paul W Huber

(57) ABSTRACT

A method for noise filtering including receiving directional data corresponding to the relative directions of at least one noise source and at least one target audio source; capturing noise data from the at least one noise source; capturing target audio data from the at least one target audio source; using the directional data to filter the noise data from the target audio data; and outputting filtered target audio.

11 Claims, 12 Drawing Sheets

(51) Int. Cl.

| | | |
|---|---|---|
| *B64C 39/02* | (2023.01) | |
| *G10L 25/21* | (2013.01) | |
| *G10L 25/57* | (2013.01) | |
| *H04R 1/40* | (2006.01) | |
| *H04R 3/00* | (2006.01) | |
| *H04R 19/04* | (2006.01) | |
| *G10L 21/0216* | (2013.01) | |
| *B64U 101/00* | (2023.01) | |

(52) U.S. Cl.
CPC ........... *G10L 2021/02166* (2013.01); *H04R 2201/003* (2013.01); *H04R 2201/403* (2013.01)

(56) References Cited

U.S. PATENT DOCUMENTS

| | | |
|---|---|---|
| 3,913,702 A | 10/1975 | Wirt et al. |
| 3,937,590 A | 2/1976 | Mani |
| 3,964,694 A | 6/1976 | Metzger et al. |
| 4,104,002 A | 8/1978 | Ehrich |
| 4,410,065 A | 10/1983 | Harvey |
| 4,508,486 A | 4/1985 | Tinker |
| 4,831,874 A | 5/1989 | Daubin et al. |
| 4,883,240 A | 11/1989 | Adamson et al. |
| 5,150,857 A | 9/1992 | Moffitt et al. |
| 5,152,478 A | 10/1992 | Cycon et al. |
| 5,190,441 A | 3/1993 | Murphy et al. |
| 5,543,198 A | 8/1996 | Wilson |
| 5,808,243 A | 9/1998 | McCormick et al. |
| 5,890,441 A | 4/1999 | Swinson et al. |
| 6,270,038 B1 | 8/2001 | Cycon et al. |
| 6,502,787 B1 | 1/2003 | Barrett |
| 6,621,764 B1 | 9/2003 | Smith |
| 6,661,781 B1 | 12/2003 | Chitre et al. |
| 6,698,685 B2 | 3/2004 | Walmsley |
| 6,827,180 B2 | 12/2004 | Wilson |
| 6,866,475 B2 | 3/2005 | Rivers |
| 7,080,712 B2 | 7/2006 | Tsuiki et al. |
| 7,181,891 B2 | 2/2007 | Surace et al. |
| 7,510,052 B2 | 3/2009 | Ayle |
| 7,520,466 B2 | 4/2009 | Bostan |
| 7,540,354 B2 | 6/2009 | Morin et al. |
| 7,712,701 B1 | 5/2010 | Ehrmantraut et al. |
| 7,841,563 B2 | 11/2010 | Goossen et al. |
| 8,070,092 B2 | 12/2011 | Bouldin et al. |
| 8,123,460 B2 | 2/2012 | Collette |
| 8,240,597 B2 | 8/2012 | Entsminger et al. |
| 8,328,130 B2 | 12/2012 | Goossen |
| 8,708,093 B2 | 4/2014 | Fisk et al. |
| 9,442,496 B1 | 9/2016 | Beckman et al. |
| 9,457,901 B2 | 10/2016 | Bertrand et al. |
| 9,474,265 B2 | 10/2016 | Duncan et al. |
| 9,476,385 B2 | 10/2016 | Moore et al. |
| 9,489,937 B1 | 11/2016 | Beard et al. |
| 10,017,249 B1 | 7/2018 | Tseng et al. |
| 10,979,805 B2 * | 4/2021 | Chowdhary .............. B81B 7/00 |
| 2003/0235495 A1 | 12/2003 | Rivers |
| 2004/0165736 A1 | 8/2004 | Hetherington et al. |
| 2005/0082421 A1 | 4/2005 | Perlo et al. |
| 2005/0127239 A1 | 6/2005 | Srivastava |
| 2005/0271221 A1 | 12/2005 | Cerwin |
| 2010/0143151 A1 | 6/2010 | Kinzie et al. |
| 2011/0001017 A1 | 1/2011 | Burdisso |
| 2011/0133025 A1 | 6/2011 | Vauchel et al. |
| 2012/0025016 A1 | 2/2012 | Methven et al. |
| 2012/0125710 A1 | 5/2012 | Fisk et al. |
| 2012/0182429 A1 | 7/2012 | Forutanpour et al. |
| 2012/0315159 A1 | 12/2012 | Fisk et al. |
| 2013/0051577 A1 * | 2/2013 | Morcelli ................ H04R 3/005 381/92 |
| 2014/0133964 A1 | 5/2014 | Ayle |
| 2015/0056058 A1 | 2/2015 | Grissom et al. |
| 2015/0175258 A1 | 6/2015 | Lee |
| 2016/0063987 A1 | 3/2016 | Xu et al. |
| 2016/0083073 A1 | 3/2016 | Beckman |
| 2016/0118033 A1 | 4/2016 | Owen, Jr. et al. |
| 2017/0220036 A1 | 8/2017 | Visser et al. |
| 2017/0339487 A1 | 11/2017 | Alvord et al. |
| 2018/0075834 A1 | 3/2018 | Fong |
| 2018/0208302 A1 | 7/2018 | Schaube et al. |
| 2018/0257196 A1 | 9/2018 | Simpson et al. |
| 2020/0279100 A1 * | 9/2020 | Volkart ................. G06V 20/52 |
| 2021/0163132 A1 * | 6/2021 | Xu ........................ B64C 39/024 |

FOREIGN PATENT DOCUMENTS

| | | |
|---|---|---|
| CN | 101622174 B | 11/2012 |
| DE | 60033157 T2 | 11/2007 |
| DE | 102007046253 A1 | 4/2008 |
| DE | 102007019762 A1 | 10/2008 |
| EP | 0716272 B1 | 1/2000 |
| EP | 1117588 A1 | 7/2001 |
| EP | 1310658 A2 | 5/2003 |
| EP | 2334557 B1 | 10/2012 |
| EP | 1673279 B1 | 7/2013 |
| EP | 2706009 A1 | 3/2014 |
| EP | 3366586 A1 | 8/2018 |
| ES | 2289445 T3 | 2/2008 |
| FR | 2871136 A1 | 12/2005 |
| GB | 2252078 A | 7/1992 |
| JP | 5500453 B | 5/2014 |
| KR | 1169742 B1 | 7/2012 |
| KR | 1663792 B1 | 10/2016 |
| RU | 2467191 C2 | 11/2012 |
| RU | 2594657 C2 | 8/2016 |
| WO | 2000064736 A1 | 11/2000 |
| WO | 2005072233 A2 | 8/2005 |
| WO | 2005125267 A2 | 12/2005 |
| WO | 2006066561 A1 | 6/2006 |
| WO | 2010003988 A1 | 1/2010 |
| WO | 2014007883 A1 | 1/2014 |
| WO | 2014066508 A2 | 5/2014 |
| WO | 2015103700 A1 | 7/2015 |
| WO | 2016048897 A1 | 3/2016 |
| WO | 2016057999 A1 | 4/2016 |
| WO | 2016112124 A2 | 7/2016 |
| WO | 2017021628 A1 | 2/2017 |
| WO | 2019221613 A1 | 11/2019 |

OTHER PUBLICATIONS

"Adaptive Antenna Systems"—B. Widrow, P. Mantey, L. Giiffiths, and B. Goode.

Optimum Array Processing: Part IV of Detection, Estimation, and Modulation Theory—Harry L. Van Trees—Copyright Ⓐ 2002 John Wiley & Sons, Inc.—ISBNs: 0-471-09390-4 (Hardback); 0-471-22110-4 (Electronic).

http://repozytorium.p.lodz.pl/bitstream/handle/11652/1663/Experimental_investigations_acoustic_Rydlewicz_2016.pdf?sequence=1&isAllowed=y.

Foreign Communication From a Related Counterpart Application, International Search Report and Written Opinion dated Aug. 22, 2019, International Application No. PCT/NZ2019/050053 filed on May 15, 2019.

* cited by examiner

SYSTEMS AND METHODS FOR AUDIO CAPTURE

CROSS-REFERENCE TO RELATED APPLICATIONS

The present application is a filing under 35 U.S.C. 371 as the National Stage of International Application No. PCT/NZ2019/050053, filed May 15, 2019, entitled "SYSTEMS AND METHODS FOR AUDIO CAPTURE," which claims priority to New Zealand Application No. 742606 filed with the Intellectual Property Office of New Zealand on May 16, 2018 and entitled "SYSTEMS AND METHODS FOR AUDIO CAPTURE," both of which are incorporated herein by reference in their entirety for all purposes.

FIELD

This invention relates to systems and methods for audio capture. More particularly, but not exclusively, the invention relates to systems and methods for noise filtering in audio capture.

BACKGROUND

Many aircraft, such as unmanned aerial vehicles (UAVs), helicopters, vertical lift systems and fixed-wing aircraft, disadvantageously produce noise. In UAVs, noise may be produced by an engine (due to, for example, the exhaust or combustion), a motor assembly (due to, for example, vibration), interaction of airflow with the UAV and/or the UAV's propellers. In audio capturing UAVs, the noise produced by the UAV itself may be significantly greater than a target audio signal and the noise may prevent or impede the UAV's audio capture or processing.

Noise produced by UAVs is a particular problem for UAVs used for video and audio capture for filming. Such filming may be for live broadcasting, recording events (for example, concerts), or it may be for entertainment and documentary purposes (such as filming for television or movies).

Current UAV audio capture for filming requires expensive and time-consuming post-processing to remove noise produced by the UAVs. Typically, audio is captured during UAV filming by having a microphone on the ground and/or by having the target of interest wearing a separate microphone. This has the disadvantage of UAV noise being picked up by the microphones on the ground and/or the target of interest. This requires expensive and time-consuming post-processing. Further, it requires ground or body microphones to be set up, limiting versatility.

Other areas in which UAV noise is a concern include UAV audio capture in defence and security, law enforcement, industrial, and remote communication applications. UAVs are well suited for such applications because they are quickly deployable, they may be deployed remotely and they may cover significant distances. Audio capture may be used to identify targets (for example, through spectral analysis), for acoustic source localization or to measure noise levels. In defence and security applications, audio may be captured for gunfire detection. In industrial applications, audio captured by UAVs may be used to detect mechanical faults and evaluate noise compliance. UAVs may be used to allow remote communication. For example in search and rescue, UAVs may be used to capture audio from a survivor in a remote location (and transmit this to search and rescue personnel). In another example, in logistics (such as package delivery) audio from a recipient may be captured (and transmitted to the delivery company). Hobby/recreational/selfie UAV users may also wish to record audio.

The present invention may provide improved audio capture or at least provide the public or industry with a useful choice.

SUMMARY

According to one example embodiment there is provided a method for noise filtering including: receiving directional data corresponding to the relative directions of at least one noise source and at least one target audio source; capturing noise data from the at least one noise source; capturing target audio data from the at least one target audio source; using the directional data to filter the noise data from the target audio data; and outputting filtered target audio.

The directional data may be used to determine at least one beamforming configuration wherein at least one beam associated with the beamforming configuration captures at least one of the noise source or the target audio source. The method may include the step of applying the beamforming configuration to sound data captured by the sound capturing device.

The noise data and target audio data may be captured using a sound capturing device, and the directional data may be used to estimate the power of the noise data and/or target audio data at the sound capturing device.

The sound capturing device may include a target audio capturing device and a noise capturing device, and the directional data may be used to estimate the power of the noise data and/or target audio data at the target audio capturing device.

According to another example embodiment, there is provided a system for an unmanned aerial vehicle (UAV) including: a sound capturing device configured to capture noise data from at least one noise source and to capture target audio from at least one target audio source; and a processing unit configured to: receive directional data corresponding to the relative directions of the at least one noise source and the at least one target audio source; receive the noise data and the target audio data; use the directional data to filter the noise data from the target audio data; and output filtered target audio.

The directional data may be used to estimate the power of the noise data and/or target audio data at the sound capturing device.

The system may include a directional sensor configured to sense the direction of the noise source relative to the UAV and the direction of the target audio source relative to the UAV, and the processing unit may be configured to determine a relative direction between the noise source and the target audio source.

The sound capturing device may include a noise capturing device configured to capture the noise data and a target audio capturing device configured to capture the target audio. The system may further include at least one sensor and the processing unit may be configured to receive sensor data from the at least one sensor and associate the filtered target audio with the sensor data. The at least one sensor may include a video camera configured to capture video data and the processing unit may be configured to associate the filtered target audio with the video data. A direction of the target audio capturing device may be aligned with a direction of the video camera. The at least one sensor may be a positional sensor, and the processing unit may be configured to associate the filtered target audio with positional data.

The sound capturing device may include a MEMS microphone. The sound capturing device may be an array of microphones.

The sound capturing device may be attached to the UAV via a gimbal.

According to a yet further example embodiment, there is provided a method for noise filtering including: receiving directional data corresponding to the relative directions of at least one noise source and at least one target audio source; steering a sound capturing device to capture noise data from the at least one noise source and to capture target audio data from the at least one target audio source; using the directional data to filter the noise data from the target audio data; and outputting filtered target audio.

The step of steering the sound capturing device may include applying a beamforming configuration to redirect at least one beam to capture the at least one noise source and/or the at least one target audio source.

The sound capturing device may be mounted via a gimbal and the step of steering the sound capturing device may include steering the gimbal to redirect the sound capturing device.

The sound capturing device may include a noise capturing device to capture the noise data and a target audio capturing device to capture the target audio, and wherein the target audio capturing device may be mounted via a gimbal and the step of steering the sound capturing device may include steering the gimbal to redirect the target audio capturing device towards the target audio source.

According to another example embodiment, there is provided a system for noise filtering for an unmanned aerial vehicle (UAV) including: a sound capturing device configured to capture noise from at least one noise source and configured to capture target audio from at least one target audio source, wherein the sound capturing device is steerable independently from the UAV; and a processing unit configured to: receive directional data corresponding to the relative directions of the at least one noise source and the at least one target audio source; receive the noise data and the target audio data; use the directional data to filter the noise data from the target audio data; and output filtered target audio.

The sound capturing device may be mounted to the UAV via a gimbal and the sound capturing device may be steered by steering the gimbal.

The sound capturing device may be configured to be steered independently from the UAV by beamforming.

The sound capturing device may include a noise capturing device to capture the noise data and a target audio capturing device to capture the target audio, and the target audio capturing device may be mounted to the UAV via a gimbal and the target audio capturing device may be steered by steering the gimbal.

The sound capturing device may include a MEMS microphone. The sound capturing device may be an array of microphones.

According to another example embodiment, there is provided an unmanned aerial vehicle (UAV) payload including a system as described above.

According to a further example embodiment there is provided a method of noise filtering including:
determining a beam forming pattern comprising a main beam and a null beam;
capturing noise data using the null beam;
capturing target audio data using the main beam;
filtering the noise data from the target audio data; and
outputting filtered target audio.

The null beam may captures all of the significant noise sources.

The null beam may have a beam width of at least 1800.

The null beam may have a beam width of 360°–X°, where X is the beam width of the main beam.

The null beam may have a gain which varies by less than 20% across it's beam width.

The null beam may have a frequency range, defined by a lower frequency, where the gain which varies by less than 20% at the lower frequency.

The noise data may be filtered from the target audio data uses a simplified 2×2 gain matrix, which characterises the gain of the main beam in the forward direction and reverse direction, and the null beam in the forward direction and reverse direction.

A gimbalised microphone may be configured to use the method above.

The microphone may be a MEMS array.

The microphone may alternatively be an end-fire line microphone array.

One or more sensors may detect directional data corresponding to the relative directions of the gimbalised microphone and a mounting to a unmanned aerial vehicle (UAV); and a processing unit may use the directional data to filter the noise data from the target audio data.

Alternatively the noise data may be filtered from the target audio data without a relative direction of the gimbalised microphone and a mounting to a unmanned aerial vehicle (UAV).

An unmanned aerial vehicle (UAV) may include a gimbalised microphone as above.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

The systems, methods and devices described herein provide improved target audio capture using unmanned aerial vehicles (UAVs). For the purposes of this description, 'target audio' will be used to refer to the sound that is intended to be captured. For example, target audio may include the speech of a person being filmed, the ambient sound of a scene being filmed, or the sound coming from an industrial location. 'Noise' will be used to refer to unwanted and/or background sound that is not the target audio. While this will primarily include sound produced by the UAV itself (for example, sound from the motor and/or propeller assembly of the UAV), it may not be limited in this respect. For example, it may also include background sounds in a scene being filmed, or ambient environmental sounds (when such sounds are not intended to be captured).

Figure 1:
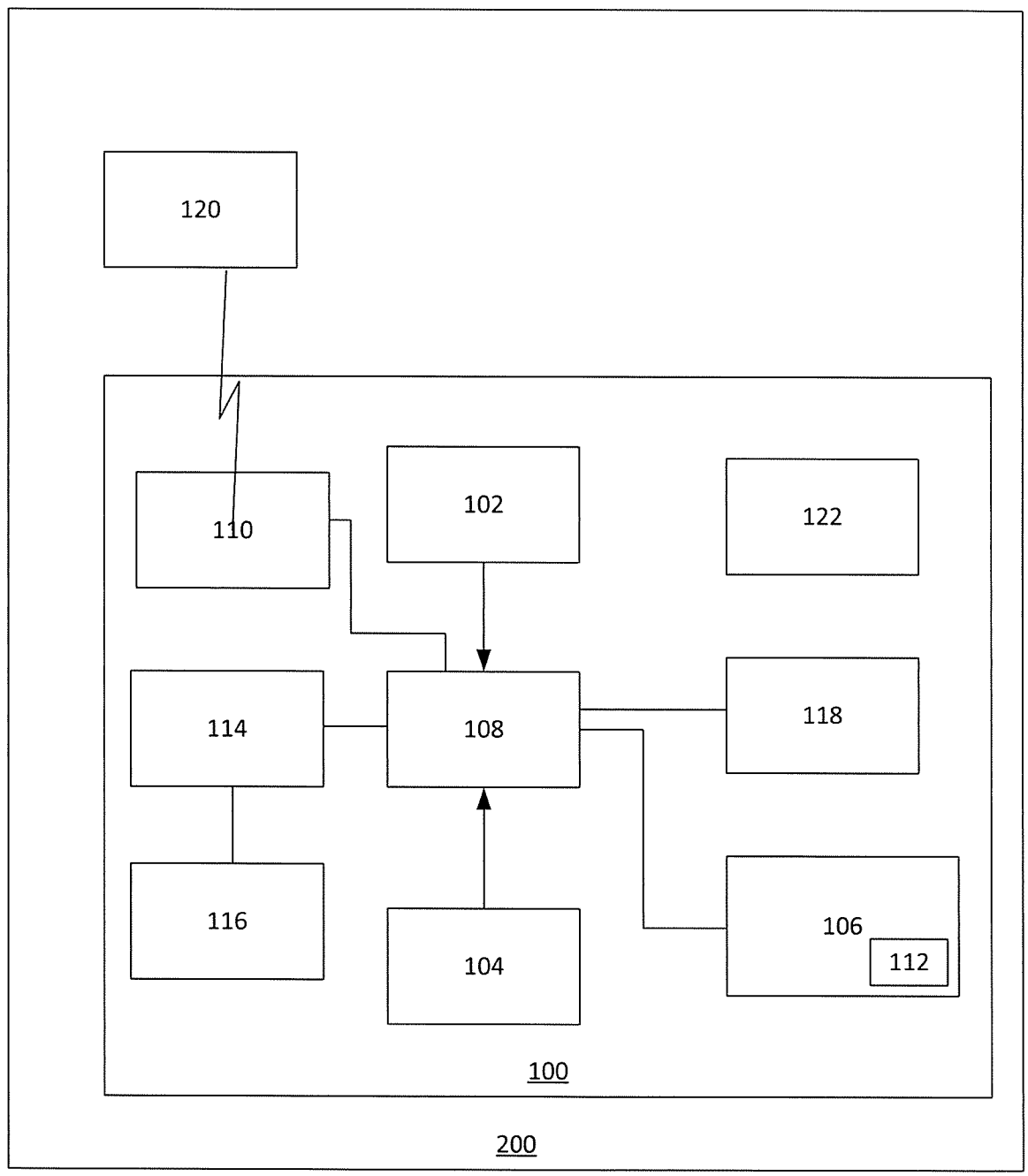
FIG. 1 is a block diagram of a UAV including a system for noise filtering.

Before describing the methods for noise filtering, it is helpful to give an overview of the system. FIG. 1 shows a block diagram of a UAV 200 including a system 100 for noise filtering. The system 100 may be located on or about the UAV 200. The system 100 may be configured as a payload that can be removably or permanently mounted to a UAV. The system may also be incorporated partially or completely into the UAV itself.

The system may include a sound capturing device, which may comprise a target audio capturing device 102 configured to capture target audio and a noise capturing device 104 configured to capture noise. While the target audio capturing device 102 and noise capturing device 104 are shown as distinct elements, in some embodiments they may be part of a single element. Embodiments of the target audio capturing device 102 and noise capturing device 104 will be described in more detail below.

The system 100 may include a sensor module 106. The sensor module 106 may include various sensors configured to sense information about the system, including information related to the target audio source, the noise source and/or the UAV itself. For example, the sensor module 106 may include a GPS sensor 112 configured to sense the GPS location of the system 100 (and therefore also the GPS location of the UAV 200 to which the system 100 is attached). The sensor module may also include sensors configured to sense the relative direction of the target audio capturing device 104 and/or the noise capturing device 106. Other possible sensors will be described in more detail below. The system 118 may include an image capturing device 118. The image capturing device 118 may be used for applications of the system where image capture is required (for example, for filming purposes). The image capturing device 118 may include a video camera suitable for the type of filming required (for example, for recreational use the camera may be a relatively light and inexpensive video camera whereas for cinematic filming, the camera may be a relatively heavy, but higher quality, cinematic camera). The image capturing device 118 may also include a photographic camera for capturing still images, which may be more suitable in some applications when video is not required. At least some of the components of the system may be mounted on a gimbal (not shown in FIG. 1). In one embodiment, the whole system 100 may be mounted to the UAV 200 on a gimbal such that the system is steerable with respect to the UAV 200. In other embodiments, parts of the system may be mounted on a gimbal, attached to the rest of the system or to the UAV itself. For example, the target audio capturing device 102, noise capturing device 104 and image capturing device 118 may together, or each be mounted on a gimbal, in turn attached to the system 100. In this way, these devices may be steerable with respect to the rest of the system 100, with respect to the UAV 200 and/or with respect to each other.

The system 100 may include a control module 114. The control module 114 may be connected to an actuator 116. The actuator 116 may be a gimbal motor or motors, which may be controlled to steer the gimbal or gimbals described above. For example, where the whole system is mounted on a gimbal, the actuator may be controlled to steer the gimbal so that the target audio capturing device 102 is directed towards the target audio source. In another example, if the target audio capturing device 102 is mounted on a first gimbal and the image capturing device 118 is mounted on a second gimbal, the actuator may include a first gimbal motor, which may be controlled to steer the first gimbal so that the target audio capturing device 102 is directed towards the target audio source, and a second gimbal motor, which may be controlled to steer the second gimbal so that the image capturing device 102 is directed towards the image needing to be captured.

The modules and devices described above may all be connected to a processing unit 108. The processing unit 108 may be configured to receive inputs from the various modules and devices, to process information, and to produce outputs that control the operation of the various modules and devices. For simplicity, the processing unit 108 is shown in FIG. 1 as a single module, but it may be divided into multiple modules, some of which may be incorporated into the other modules of the system. For example, the sensor module may have the capacity to undertake some processing of information itself, in which case the processing unit may be considered to be, at least in part, incorporated into the sensor module.

The system may also include a communication module 110. The communication module may be configured for two-way communication with a remote processing unit 120. Such two-way communication may be by any suitable wired or wireless communication protocol. While the remote processing unit 120 of FIG. 1 is shown as being part of the UAV 200, in some embodiments the remote processing unit may be located remote from the UAV 200 (for example, a laptop located on the ground). In this way, the processing of the methods described below may be processed the processing unit 108, by the remote processing unit 120 or a combination of both. The communication module may communicate with a further communication module (not shown) incorporated in the UAV. The further communication module may be configured to communicate with a remote device (for example, a laptop that a user is using to control the operation of the UAV). In this way, the system 100 does not need to establish a separate line of communication with a remote device, but can rely on the existing line of communication between the UAV and remote device.

Various components of the system may be implement as one or more suitable integrated circuits. For example, the integrated circuits may be an ASIC or FPGA, which may be well suited for UAV applications due to their relatively low weight, size and low power consumption.

The system 100 also includes a power source 122. The power source supplies power to the various modules and devices of the system 100. The power source may be a battery, which may be replaced or recharged. While the power source 122 is shown as part of system 100, in another embodiment, the power source may be part of the UAV 200. However, it may be beneficial to provide a distinct power source for the system 100 (rather than rely on the existing power source of the UAV), as the power source of the UAV may be 'noisy', which could impact the quality of signals produced by the various modules and devices and ultimately impact the quality of the noise filtering.

Figure 2:
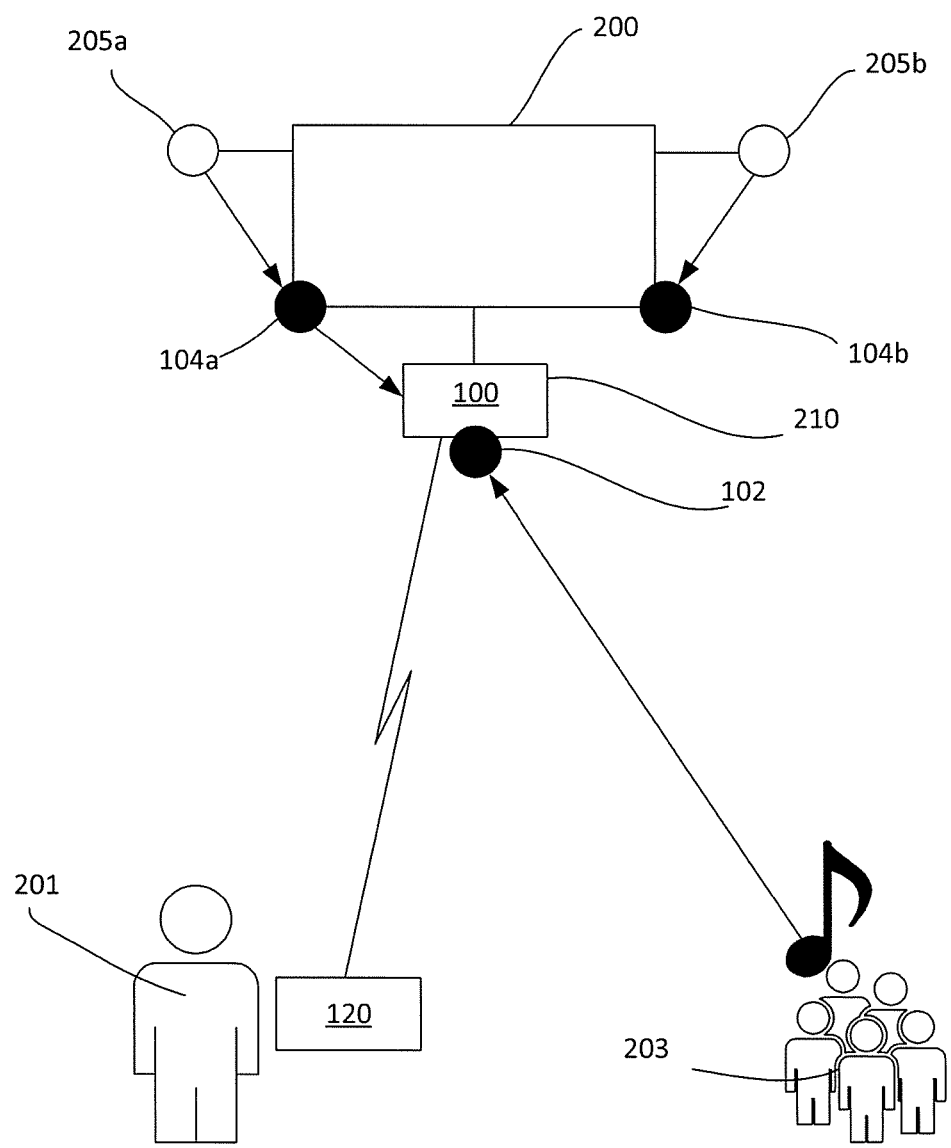
FIG. 2 is a block diagram of the system for noise filtering in an example context.

FIG. 2 is a block diagram showing the UAV 200 and system 100 described above in an example context. FIG. 2 shows the system 100 configured as a payload 210 mounted to a UAV 200. FIG. 2 shows a user 201 who is controlling the UAV 200 and using the system 100 for capturing target audio from a target audio source 203. For example, the user may be using the UAV 200 to film a protest, where it is desirable to capture what the protesters are saying. The user 201 uses a remote device including a remote processing unit 120, which is in wireless communication with the communication module to control the system 100. The user 201 may also use the remote processing unit 120 to control the UAV 200 (for example, to fly the UAV).

The payload 210 is mounted to the UAV 200 via a gimbal, and may be movable independent from the UAV 200. The user may fly the UAV 200 towards the target audio source. The user controls the system 100 so that the image capturing device (not shown) is directed toward the target audio source (thereby filming the scene). The target audio capturing device 102, which has been configured to be aligned with the axis of the image capturing device, will therefore also capture target audio from the target audio source 203.

Noise is captured from one or more noise sources 205a 205b (such as the propellers of the UAV 200) by a noise capturing device 104. As shown in FIG. 2, the noise capturing device 104 may have two parts 104a 104b. Each part may be positioned on or about the UAV 200 to better capture the noise from a noise source (for example, they may be mounted either side of the UAV 200 to capture noise from the left 205a and right 205b propellers) and they may be directed towards the noise source. In this embodiment, while the noise capturing device 104 may be considered part of the system 100, it is mounted directly onto the UAV 200 rather than as part of the payload 210. In this way, when the user steers the payload (for example, to direct the image capturing device towards a scene being filmed), the position and direction of the noise capturing device 104 with respect to the noise source 205a 205b is not affected.

As will be described in more detail below, the processing unit of the system 100 uses the sensor module to determine the position and/or direction of the target audio capturing device 102 relative to the noise capturing device 104. The parameters of a noise filtering algorithm are adjusted using this position and/or direction information. The processing unit uses the adjusted noise filtering algorithm to output filtered target audio based on the captured target audio. Thus the system is able to capture reasonably clean target audio from the target audio source 203, minimizing interference from the noise of the UAV 200 itself. The filtered target audio is time-synced with the captured video. The filtered target audio and video may be livestreamed to the remote processing unit 120 and may be viewable by the user 201.

Target Audio and Noise Capturing Devices

In one embodiment, the target audio capturing device 102 and noise capturing device 104 may be a sound capturing device. The sound capturing device may include any suitable number of microphones. Without limitation, such microphones may be MEMS microphones, condenser microphones (for example, electret condenser microphones), electret microphones, parabolic microphones, dynamic microphones, ribbon microphones, carbon microphones, piezoelectric microphones, fiber optic microphones, laser microphones and/or liquid microphones. A microphone may be used because of its particular polar pattern, for example, a hyper-cardioid shotgun microphone, a three cardioid microphone and/or an omnidirectional microphone. The microphone may be formed as an array. For example, an array of two or three cardioid or omnidirectional microphones, or an array of MEMS microphones.

The microphone may be selected to take advantage of its particular properties. Such properties may include directionality (as shown by its characteristic polar pattern), frequency response (which may correspond to the target audio and/or noise), or signal to noise ratio.

Using directional beaming forming (MVDR or similar) may require characterisation by impulse response to generate the beam. The beam performs optimally when the sound source or noise source is exactly in the direction characterized for, but performance degrades as the array's physical orientation changes and the sources are no longer aligned. In other words each UAV would ideally need to be initially calibrated with a wide range of relative gimbal orientations. In use a specific gimbal location would be approximated to the nearest calibration point, with varying degrees of effectiveness.

Figure 3A:
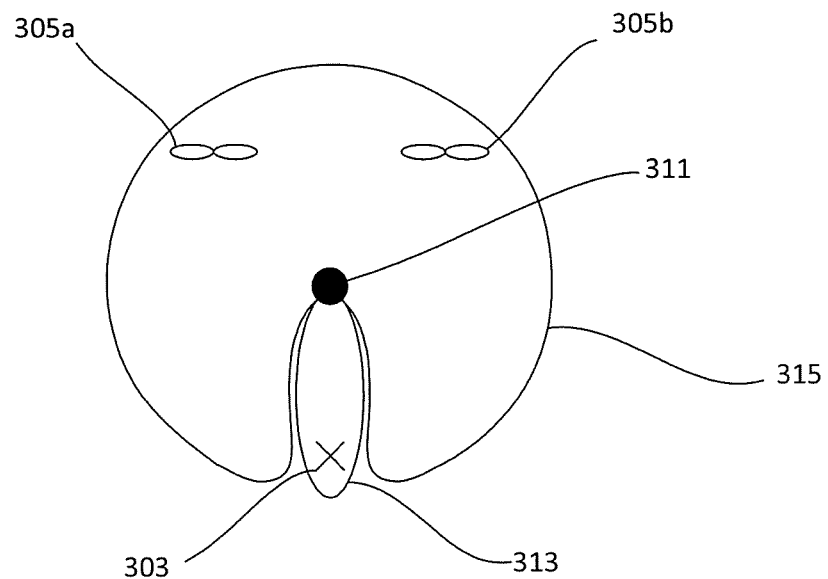
FIGS. 3a & 3b are polar patterns of a sound capturing device according to one embodiment.

In one embodiment, the sound capturing device may be an array of MEMS microphones, that have been configured to have a polar pattern as shown in FIG. 3a. The polar pattern illustrates that the sound capturing device 311 has two lobes of sensitivity. As will be described in more detail below, the target audio and noise may then be used for noise filtering to produce filtered target audio.

Figure 3B:
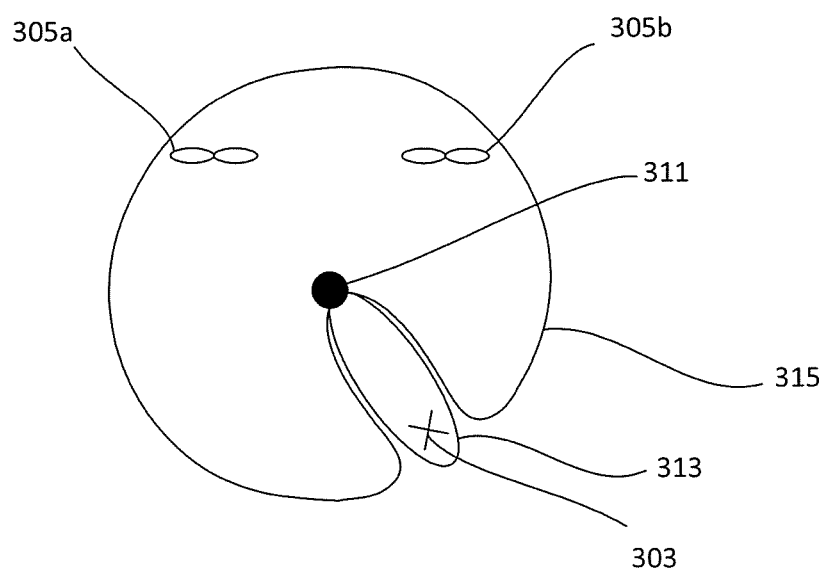

This sound capturing device 311 is advantageous because the polar pattern is such that if the first lobe 313 of sensitivity is directed towards the target audio source 303 the sound capturing device will capture the target audio. The shape of the second lobe 315 of sensitivity means that the sound capturing device will also be able to capture noise from noise sources (for example propellers 305a 305b, which are fixed in relation to the location of the sound capturing device 311) outside the target audio. Another advantage is that regardless of the relative position of the first lobe 313 of sensitivity with respect to the noise source, the noise from the noise source is going to be captured within the second lobe 315 and with reasonably consistent gain. This is illustrated by FIG. 3b. The target audio source 303 has moved relative to the sound capturing device (by comparison to FIG. 3a), requiring the sound capturing device 311 to be redirected so that the first lobe 313 of sensitivity is directed towards the target audio source 303. However, noise from the noise sources 305a 305b, while now a different direction relative to the sound capturing device, will still be captured by the second lobe 315. Further benefits of this will become apparent when the method for noise filtering is described in more detail below.

A beam with a wide capture area with near-equal gain across frequencies may be more suitable for mounting on moving gimbal systems on UAVs, as the inaccuracies of the response to the relative change in position of the noise source(s) are reduced.

For the purposes of noise filtering using beamforming to capture the sound and noise sources, the wider beam is advantageous as it will provide a more complete capture of the noise being received by the audio capture device. The lesser variation of response across the beam capture arc also helps by reducing the error in source separation, which is worse the further the response strays from the target.

The array and beamformer may use a null beam with the wide and invariant response that closely approximates the ideal situation described above. This allows its use in gimbal mounted drone systems that will move the array relative to noise sources while maintaining performance required for noise filtering.

This also means that a single implementation with the wider null beam is transferable between drone frames with distinct motor positions while still capturing them as noise sources. It may allow not just transfer between drone frames of the same model but also between drones of different model.

In one example the null beam may be wide enough to capture all of the noise sources. In that case the noises source such as the motors/rotors may be defined in terms od known relative directions, known relative distance the audio recording device (quite close) and of a signal power significant compared to the signal of interest, perhaps ranging from −5 dB down to +10 dB up from the signal. For example, in a quad copter UAV, depending on the location of the gimbal, the null beam may be at least 180°. In other examples, with different main beam widths, the null beam may be 355°, 350°, 340°, 330°, 320°, 310°, 300°, 290°, 280°, 270°, 260°, 250°, 240°, 230°, 220°, 210°, 200°, or 190°. Alternatively the null beam may be defined by the absence of the main beam. For example if the user selects a main beam width of X°, then the null beam width may be 360−X°, or may be 360−X°−Y°, where Y is a buffer width, which may be fixed or may be user selectable, or may be determined based on an algorithm.

The level of reasonably consistent gain across the angle of the null beam may vary depending on the application. For example, in a typical commercial audio capture on a quad copter UAV, the gain may vary by less than 20% across the beam width. In other examples, the null beam gain may vary by less than 40, 35, 30 or 25% across the beam width.

The MEMS array may use an end-fire line microphone array as the audio capture device. The end-fire line array would have a form factor similar to a standard shotgun microphone. This shape would be more suitable than other arbitrary array structures which may be less suitable for the mounting constraints of a drone gimbal.

The end-fire array structure also lends itself to having the greatest possible directivity on either end of the array which allows for the best capture of the signal of interest/noise source with high rejection in other directions.

Such an array may provide the additional advantage of a wider and more effective frequency response. For example, the frequency performance may be characterised by the level of variation in gain across beam width of the null beam. The level of reasonably consistent gain across the frequency range may vary depending on the application. For example, the lowest useable frequency may have a null beam gain which varies by less than 20% across the beam width, such as at 150 Hz or 1 kHZ. In a typical commercial audio capture on a quad copter UAV, this may result in a useable frequency range of 150 Hz to 20 kHz for noise filtering purposes.

Figure 4A:
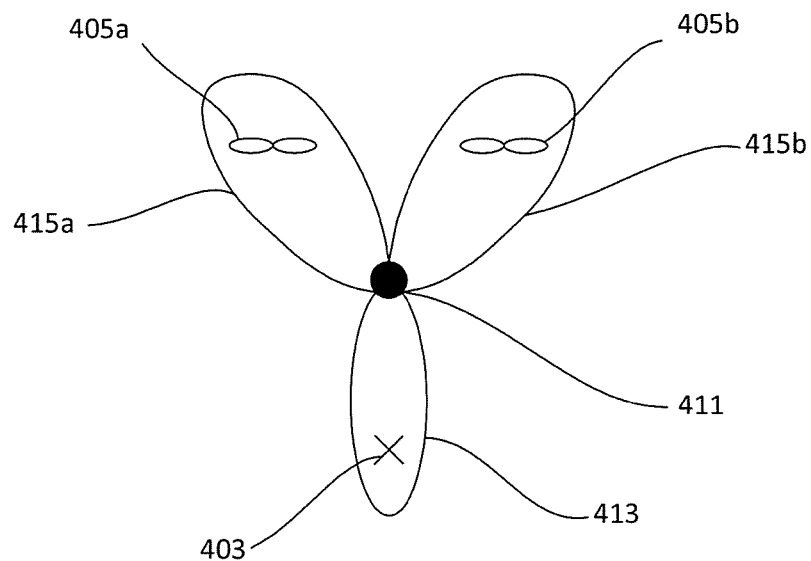
FIGS. 4a & 4b are polar patterns of a sound capturing device according to another embodiment.

In another embodiment, beamforming may be used to define lobes of sensitivity that capture both the target audio source and noise source. For example, referring to FIG. 4a, there is shown a polar pattern for a sound capturing device 411 following suitable beamforming. A first beam, as shown by a first lobe of sensitivity 413, has been configured to capture target audio from a target audio source 403. Second beams, as shown by second lobes of sensitivity 415a and 415b, have been configured to capture noise from noise sources (for example propellers 405a 405b, which are fixed in relation to the location of the sound capturing device 411). So formed, the sound capturing device 411 is able to capture target audio and noise, which may then be used for noise filtering to produce filtered target audio as described below.

Figure 4B:
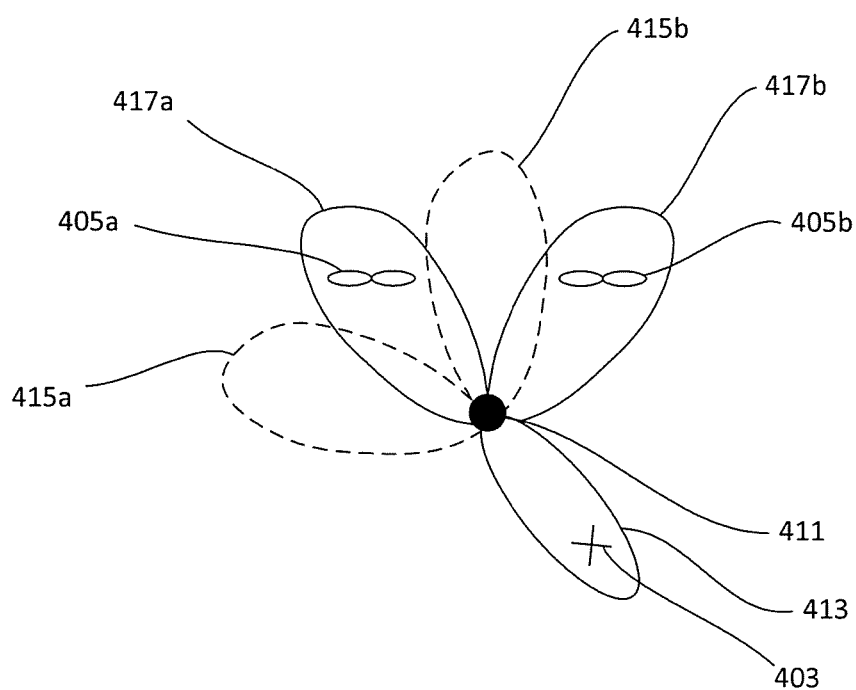

If the target audio source moves relative to the sound capturing device, the same beams will not be effective. This is illustrated by FIG. 4b. In this figure, the target audio source 403 has moved (by comparison to FIG. 4a), requiring the sound capturing device 411 to be steered so that the first lobe 413 of sensitivity is directed towards the target audio source 403. However, having moved, the noise from the noise sources 305a 305b will no longer be captured by the existing lobes of sensitivity (as shown by dashed lines 415a 415b), thereby limiting the noise that is captured. Therefore, in order to more accurately capture noise, a new beamforming configuration is implemented, as shown by 417a and 417b. Such beamforming may be understood as steering the sound capturing device in that it redirects the beams. In another embodiment, rather than physically redirecting the sound capturing device, if the target audio source is no longer within the first lobe of sensitivity, then a new beamforming configuration may be implemented where the second lobes of sensitivity remain unchanged, but the first lobe is steered so as to capture the target audio source. This approach may be beneficial as there is no need to physically redirect the sound capturing device, instead relying on steering the beams.

The sound capturing device may be enabled with multiple beamforming configurations. The sound capturing device may be configured to implement a suitable beamforming configuration depending on the relative location of the target audio source with respect to the noise source(s). In order that the appropriate beamforming configuration is implemented it may be necessary to detect the relative directions of the target audio source with respect to the noise source. For UAVs, since the primary noise source (namely the motor and propeller assembly) is fixed with respect to the UAV, it is only necessary to detect the direction of the target audio source with respect to the UAV.

In another embodiment, the target audio capturing device may be distinct from the noise capturing device. The target audio capturing device may be one or more microphones. Without limitation, such microphones may be MEMS microphones, condenser microphones (for example, electret condenser microphones), electret microphones, parabolic microphones, dynamic microphones, ribbon microphones, carbon microphones, piezoelectric microphones, fiber optic microphones, laser microphones and/or liquid microphones. A microphone may be used because of its particular polar pattern, for example, a hyper-cardioid shotgun microphone, a three-cardioid microphone and/or an omnidirectional microphone. The microphone may be formed as an array. For example, an array of two or three cardioid or omnidirectional microphones, or an array of MEMS microphones. The microphone may be selected to take advantage of its particular properties suitable for target audio capture. Such properties may include directionality (as shown by its characteristic polar pattern), frequency response (which may correspond to the target audio), or signal to noise ratio.

If multiple separate microphones are used, the microphones may be uniformly distributed about a UAV, and may be selectively turned on to capture target audio from a particular direction. In other embodiments, an array of target audio capturing devices may be uniformly radially spaced from each other on the UAV and selectively activated to capture target audio from different directions.

The noise capturing device may be one or more microphones. Without limitation, such microphones may be MEMS microphones, condenser microphones (for example, electret condenser microphones), electret microphones, parabolic microphones, dynamic microphones, ribbon microphones, carbon microphones, piezoelectric microphones, fiber optic microphones, laser microphones and/or liquid microphones. A microphone may be used because of its particular polar pattern, for example, a hyper-cardioid shotgun microphone, a three-cardioid microphone and/or an omnidirectional microphone. The microphone may be formed as an array. For example, an array of two or three cardioid or omnidirectional microphones, or an array of MEMS microphones. The microphone may be selected to take advantage of its particular properties suitable for noise capture. Such properties may include directionality (as shown by its characteristic polar pattern), frequency response (which may correspond to the target audio), or signal to noise ratio. The target audio capturing device may be the same type of microphone as the noise capturing device or may be a different type.

Position

The sound capturing device may be located as part of the payload (for example, 210 of FIG. 2) mounted to the underside of the UAV (which may be via a gimbal). The sound capturing device may be connected to the UAV by a gimbal. In this way, the sound capturing device may be steerable with respect to the UAV.

Figure 5:
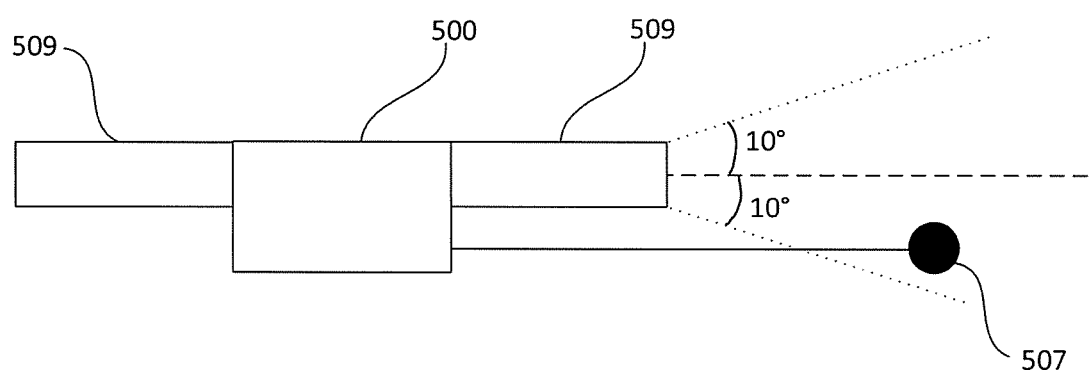
FIG. 5 is a block diagram of a UAV.

As shown in FIG. 5, the sound capturing device 507 may be mounted to the UAV 500 in the space that is within 10 degrees of the plane of the motor and propeller assembly 509. This is advantageous as the noise from the motor and propeller assembly 509 is at a minimum in this space. The sound capturing device may be mounted towards the front or the back of the UAV (rather than the side) to maintain balance. The sound capturing device (or the gimbal to which it is attached) may be mounted via a connection configured to isolate and/or dampen vibrations produced by the UAV.

Where there are distinct target audio capturing devices and noise capturing devices, these may be distanced from each other so as to minimize noise picked up by the target audio capturing devices. For example, the target audio capturing device may be positioned on a UAV payload hanging below a UAV and angled to face the ground, while the noise capturing device may be mounted closer to and directed towards the noise source(s). In another example, the target audio capturing device may be positioned directly on the side of the UAV within 10 degrees of the plane of the motor and propeller assembly (similar to the arrangement described in relation to FIG. 5. The target audio capturing device (or the gimbal to which it is attached) may be mounted via a connection configured to isolate vibrations.

The noise capturing devices may be fixed to or movable relative to the payload or the UAV. The noise capturing devices are configured to face noise sources, which are to be filtered out from target audio. Examples of noise include, but are not limited to, noise from a UAV motor and/or propeller assembly or wind noise. The noise capturing devices may be located on the arms of a UAV or near other sources of noise on the UAV.

Movability

The sound capturing device (or target audio capturing device, if distinct from the noise capturing device) may be movable relative to the UAV (and/or to the noise capturing device). For example, they may be mounted via an independently steerable gimbal. In the case that sound capturing device is not movable with respect to the UAV, the UAV itself may be moved to direct the sound capturing device towards a target audio source. In one case, the sound capturing device (or target audio capturing device, if distinct from the noise capturing device) may be aligned with an image capturing device, such that the sound capturing device is directed towards the target audio source which is also being captured by the image capturing device. In one embodiment, the sound capturing device and image capturing device may be mounted on the same gimbal to ensure they remain in alignment regardless of the direction they face.

Sensor Module

The sensor module 106 (introduced in relation to the system 100 of FIG. 1) payload may include target sensors for sensing data about a target audio source. Examples of target sensors include but are not limited to vision sensors (for example, imaging devices capable of detecting visible, infrared, or ultraviolet light, such as cameras or thermographic cameras), proximity sensors (for example, ultrasonic sensors, lidar, laser rangefinders, time-of-flight cameras) or other field sensors (e.g., magnetometers, electromagnetic sensors). Such vision sensors may be in addition to, or instead of, the image capturing device previously described. Sensor data may be passed to the processing unit 108 or communicated to a remote device.

Target data from the target sensors may be used to control the direction of the target audio capturing device to track the target audio source. The processing unit may be configured to track the target audio source automatically (for example, the target audio source may include a radio transceiver which the processing unit, via a suitable transceiver included in the sensor module, is able to detect the location of) or the tracking may require some input from a user (for example, a user may track the target audio source visually via a video captured by the image capturing device or a suitable vision sensor, and manually redirect the target audio capturing device).

Where the target audio capturing device is attached via a gimbal, the target audio source may be steered independently from the payload and/or UAV. Where the payload is attached via a gimbal, the payload itself may be steered (and thereby redirect the target audio capturing device). The sensor module may include gimbal sensors to detect the orientation of the gimbal, thereby allowing the relative direction of the target audio source or target audio capturing device with respect to the UAV to be determined. For example, if a user manually controls the payload to track a target audio source via a video feed, the gimbal sensors may sense the orientation of the gimbal and therefore the relative direction of the target audio source with respect to the UAV can be determined.

The data from the sensors may be may be associated with target audio source data, and may be used to obtain measurements from a target, to map an area, or assist UAV navigation. Sensor data may be live streamed to a remote location, communicated to a remote device, or locally stored.

The sensor module may include other sensors to determine position, orientation and/or movement of the UAV, the payload, and/or the target audio capturing device and noise capturing device. Examples of sensors include, but are not limited to, location sensors (for example, GPS sensors or mobile device transmitters enabling location triangulation), inertial sensors (for example, accelerometers, gyroscopes or inertial measurement units), altitude sensors, and/or pressure sensors. For example, the sensor module may include an electronic compass for measuring the orientation (for instance azimuth and inclination) of the UAV.

While the sensors above are described as part of the sensor module that is part of the system 100 mounted on the payload attached to the UAV. Some may be mounted on or incorporated in the UAV itself. For example, the UAV may already include a GPS sensor and the system 100 may be configured to receive data from the existing GPS system via the communication module.

"Directional data" as determined by the sensors, may include the relative angle of the sound capture device to the drone/noise sources. This may be derived from the telemetry data from the rotating gimbal on which the device is mounted, or other sensors, for selecting appropriate input parameters in a spatial noise filtering system as described below.

Target Audio Source Location

Sensor data (including, for example, gimbal data and GPS data) may be combined to calculate the absolute location of a target audio source. For example, a user may remotely direct the target audio capturing device towards the target audio source. A rangefinder (for example, a laser rangefinder, aligned with the direction of the target audio capturing device) may calculate the distance between the UAV payload and the target audio source. The gimbal sensor may detect the relative direction of the target audio capturing device with respect to the UAV and an accelerometer may be used to detect the orientation of the UAV. If the relative direction of and distance to the target audio source is known, and the absolute location of the UAV is known (for example using GPS), then the absolute location of the target audio source can be determined.

Payload

As described in relation to FIG. 2, the payload of the UAV may be located under the UAV. The payload may include the system for noise filtering described herein. Some aspects of the system however may be shared with the UAV (for example, a power source).

The payload may be removably or permanently attached to the UAV. The payload may be attached via a gimbal, enabling the payload to be steered independently from the UAV (i.e. by controlling the yaw, roll and pitch of the gimbal and therefore the payload).

Processing

The system 100 may partially or completely process audio and noise data onboard to produce filtered target audio. Alternatively, the system 100 may store audio and noise data for post processing. The system 100 may additionally include a data storage component which stores data collected and/or processed by the processing unit 108. In one embodiment, the data storage component may store data when connectivity is lost between the system 100 and a remote processing unit 108, for transmission at a later time when connectivity is restored. The data storage component may be an SD card.

Characteristics of UAV

The system for noise filtering 100 may be combined with other systems and methods which may reduce noise produced by the UAV itself. For example, the UAV's motor and propeller assembly may be shrouded, the UAV may include noise-absorbing material, and/or the UAV may be provided with noise-cancelling emitters.

The UAV may navigate by remote control, pre-programming, or autonomous navigation. The UAV may include one or more propulsion units, allowing the UAV to move with up to six degrees of freedom. The UAV may be any suitable size. The UAV may include a central body, and one or more arms extending outwardly from the central body including the UAV propulsion units. The central body may include a housing, including UAV electronics.

The UAV may itself include one or more sensors. Examples of sensors of the UAV may include, but are not limited to, location sensors (for example, GPS sensors, mobile device transmitters enabling location triangulation), vision sensors (for example, imaging devices capable of detecting visible, infrared, or ultraviolet light, such as cameras), proximity sensors (for example, ultrasonic sensors, lidars, time-of-flight cameras), inertial sensors (for example, accelerometers, gyroscopes or inertial measurement units), altitude sensors, pressure sensors, audio sensors (for example, microphones), and/or field sensors (for example, magnetometers or electromagnetic sensors).

A battery may be coupled to the UAV 200. The battery may be coupled to a UAV to provide power to one or more components of the UAV. The battery may provide power to one or more propulsion units and any other component of the UAV while coupled to the UAV. In some embodiments, the battery may also provide power to the system for noise filtering including the target audio capturing device. In other embodiments, the system relies on its own power source.

While described in relation to a UAV, embodiments may be used to improve target audio source audio capture in any suitable moving vehicles, including but not limited to UAVs, helicopters, rotorcraft, vertical lift systems and fixed-wing aircraft.

Target Audio and Noise

The UAV may be configured to fly in any suitable environment for target audio capture, including both indoor and outdoor environments. Target audio may be ambient audio, sound produced by humans, animals, machines, the environment or any other audio which one may wish to capture.

The distance between the UAV and the target audio source may vary according to the application.

Noise captured by noise capturing device may include noise produced by the UAV itself or ambient noise. Examples of noise produced by the UAV include noise produced by the motor and propeller assembly, noise produced by onboard instruments (such as gimbal motors or cameras) or noise produced by interaction of the AUV with airflow. Ambient noise may include general wind noise, noise from surrounding airborne vehicles or other environmental noise, such as traffic noise.

In some embodiments the target audio source may be closer to the target audio capturing device than the noise capturing device. Alternatively, the noise source may be closer to the target audio capturing device than the target audio source.

Remote Processing Unit

The remote processing unit 120 may be incorporated in any suitable remote device including but not limited to a personal computer, laptop, smartphone, tablet or custom device. The remote device may include a user interface for controlling the UAV and/or system for noise filtering 100, and a display for displaying data from the UAV and/or system. Such data may include sensor data and/or target audio or noise data.

The system 100 may include a control mechanism for starting and stopping audio capture. This may be useful, for example, in live broadcasting. A user having a remote device may communicate with the system 100 to start audio and/or video capture, redirect the target audio capturing device or image capturing device, and stop audio and/or video capture. The user may selectively capture audio alone or video alone.

In some embodiments, the payload may include a speaker allowing remote communication. The remote device captures an audio message from the user (for example, instructions for a person receiving a package) and transmits the audio message wirelessly to the communication module of the system, which is then emitted by the speaker. In this way, remote communication is achieved.

Filtering Method

Figure 6:
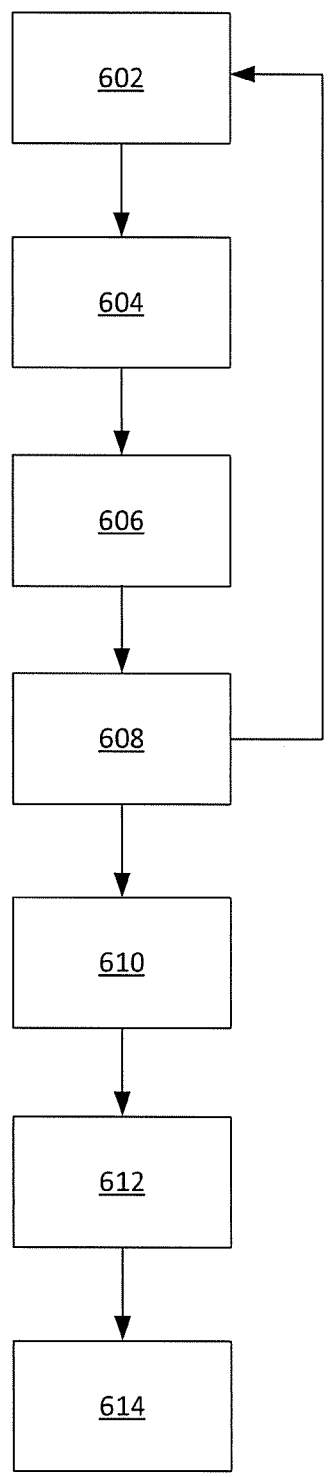
FIG. 6 a flow diagram of noise filtering according to one embodiment.

Having described the system and devices, various methods for noise filtering will now be described. FIG. 6 shows a method of producing filtered target audio using the system 100 for noise filtering described above. Such steps may be carried out by the processing unit or the remote processing unit, or a combination of both.

At step 602, the direction of a target audio source relative to the system is detected. In one embodiment, the target audio source may include a radio transceiver which communicates its position to the system 100, from which the direction towards the target audio source can be detected. In another embodiment, a user may use a video feed to steer an image capturing device to the target audio source by ensuring the target audio source is within the field of view of the image capturing device. For example, the image capturing device may be mounted to the UAV via a gimbal that can be controlled so that the field of view of the image capturing device faces the target audio source. In another example, the image capturing device may be attached to the UAV, and so the user may move the UAV (by flying it to a certain position) so that the image capturing device faces the target audio source. By determining the relative direction of the image capturing device with respect to the system, it is possible to detect the direction of the target audio source.

At step 604, the target audio capturing device (or the sound capturing device, in embodiments where the target audio capturing device and noise capturing device are provided in the same device) is directed towards the target audio source. In embodiments where an imaging capturing device has been used to detect the direction of the target audio source, the target audio capturing device may be aligned with the image capturing device such that it is automatically directed towards the target audio source. In other embodiments, the target audio capturing device may be redirected towards the target audio source, for example by controlling the gimbal to which the target audio capturing device is attached.

At step 606, the noise capturing device is directed towards the noise source. Where the primary noise source is the noise from the UAV's motor or propeller assembly, the noise capturing device or devices may already be directed to the noise source.

At step 608, the relative directions between the target audio capturing device and noise capturing device(s) is determined. Since the relative direction of the target audio capturing device with respect to the system is known (being the same as the relative direction of the target audio source detected at step 602) and the direction of the noise capturing devices is known, then the relative direction between the target audio capturing device and noise capturing device(s) is determined.

At step 610, target audio from the target audio source is captured using the target audio capturing device (or the sound capturing device, in embodiments where the target audio capturing device and noise capturing device are provided in the same device). Noise is captured from the noise source using at least one noise capturing device (or the sound capturing device, in embodiments where the target audio capturing device and noise capturing device are provided in the same device).

At step 612, the parameters of a noise filtering algorithm are adjusted using the directional data obtained at step 608.

At step 614, filtered target audio is produced using the adjusted noise filtering algorithm.

In order that target audio is continually captured, the method may continually or periodically repeat steps 602-608 in case the target audio source moves with respect to the system (for example, the target audio source may be mobile, or the UAV may move with respect to the target audio source).

Figure 7:
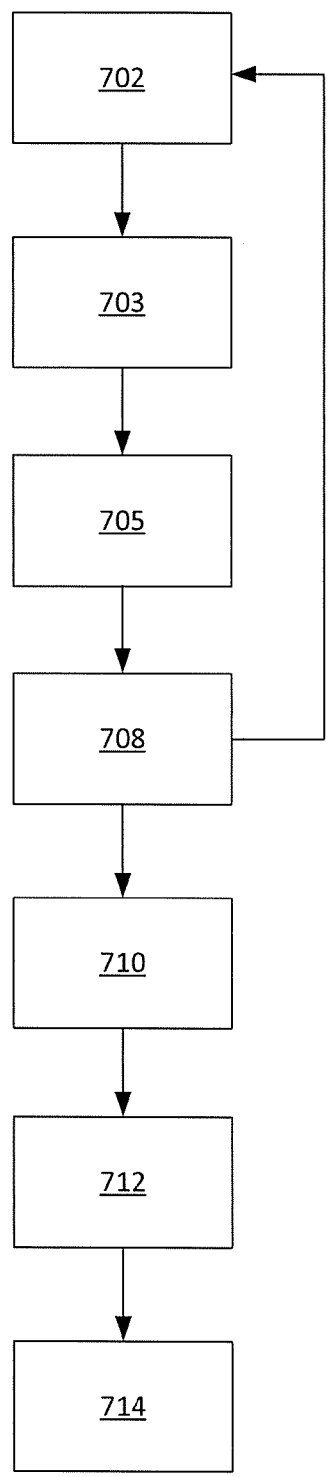
FIG. 7 a flow diagram of noise filtering according to one embodiment.

FIG. 7 shows another embodiment of a method which relies on beamforming.

At step 702, the relative direction of a target audio source relative to the system is detected in much the same way as described in relation to step 602.

At step 703, the relative direction of a noise source relative to the system is detected. Where the primary noise source is the noise from the UAV's motor or propeller assembly, the relative direction will be known.

At step 705, the sound capturing device will be implemented with a suitable beaming configuration such that the beams are directed towards the target audio source and noise source.

At step 708, the relative directions between the target audio source and noise source is determined.

At step 710, target audio from the target audio source is captured using the sound capturing device and noise is captured from the noise source using the sound capturing device.

At step 712, the parameters of a noise filtering algorithm are adjusted using the directional data obtained at step 708.

At step 714, filtered target audio is produced using the adjusted noise filtering algorithm.

In order that target audio is continually captured, the method may continually or periodically repeat steps 702-708 in case the target audio source moves with respect to the system.

Figure 8:
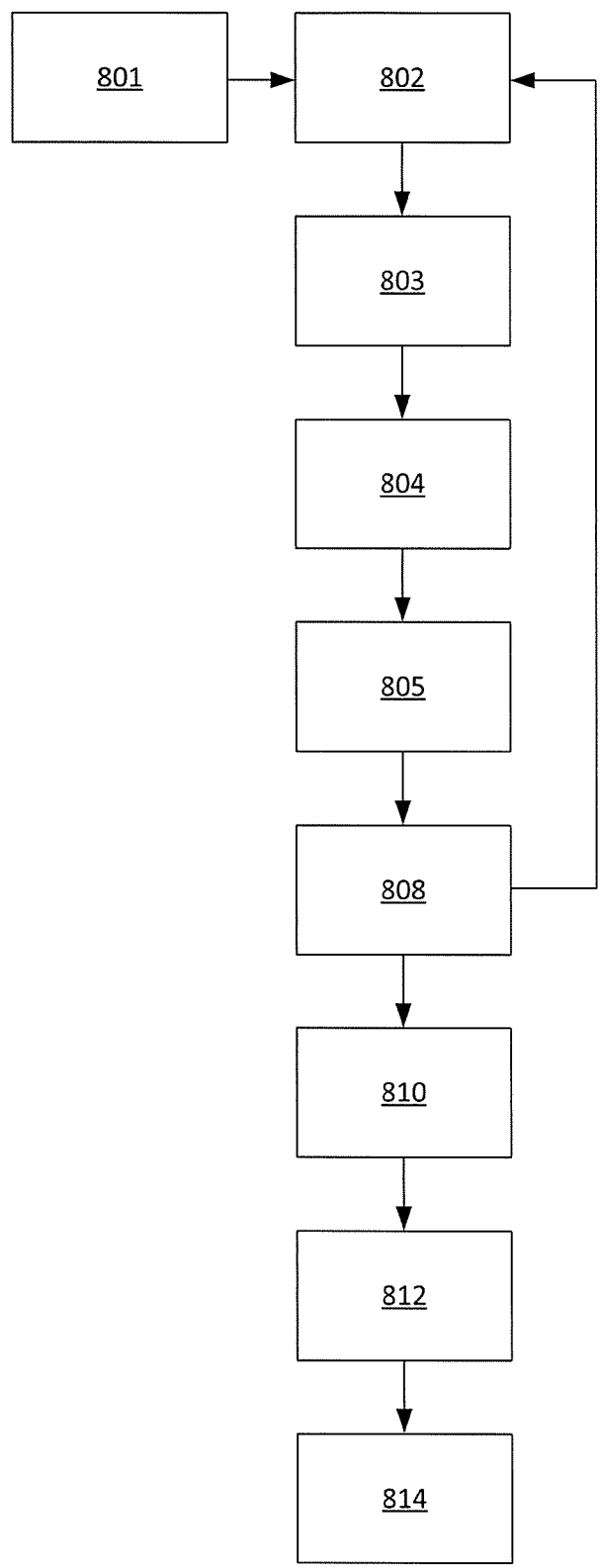
FIG. 8 a flow diagram of noise filtering according to one embodiment.

FIG. 8 shows another embodiment of a method which relies on beamforming.

At step 801, the sound capturing device is implemented with a first beamforming configuration.

At step 802, the relative direction of a target audio source relative to the system is detected in much the same way as described in relation to step 602.

At step 803, the relative direction of a noise source relative to the system is detected. Where the primary noise source is the noise from the UAV's motor or propeller assembly, the relative direction will be known.

At step 804, the sound capturing device is directed such that a target audio capturing beam is directed towards the target audio source.

At step 805, the sound capturing device will be implemented with a suitable beaming configuration such that the beams are directed towards the target audio source and noise source.

At step 808, the relative directions between the target audio source and noise source is determined.

At step 810, target audio from the target audio source is captured using the sound capturing device and noise is captured from the noise source using the sound capturing device.

At step 812, the parameters of a noise filtering algorithm are adjusted using the directional data obtained at step 808.

At step 814, filtered target audio is produced using the adjusted noise filtering algorithm.

In order that target audio is continually captured, the method may continually or periodically repeat steps 802-808 in case the target audio source moves with respect to the system.

Figure 9:
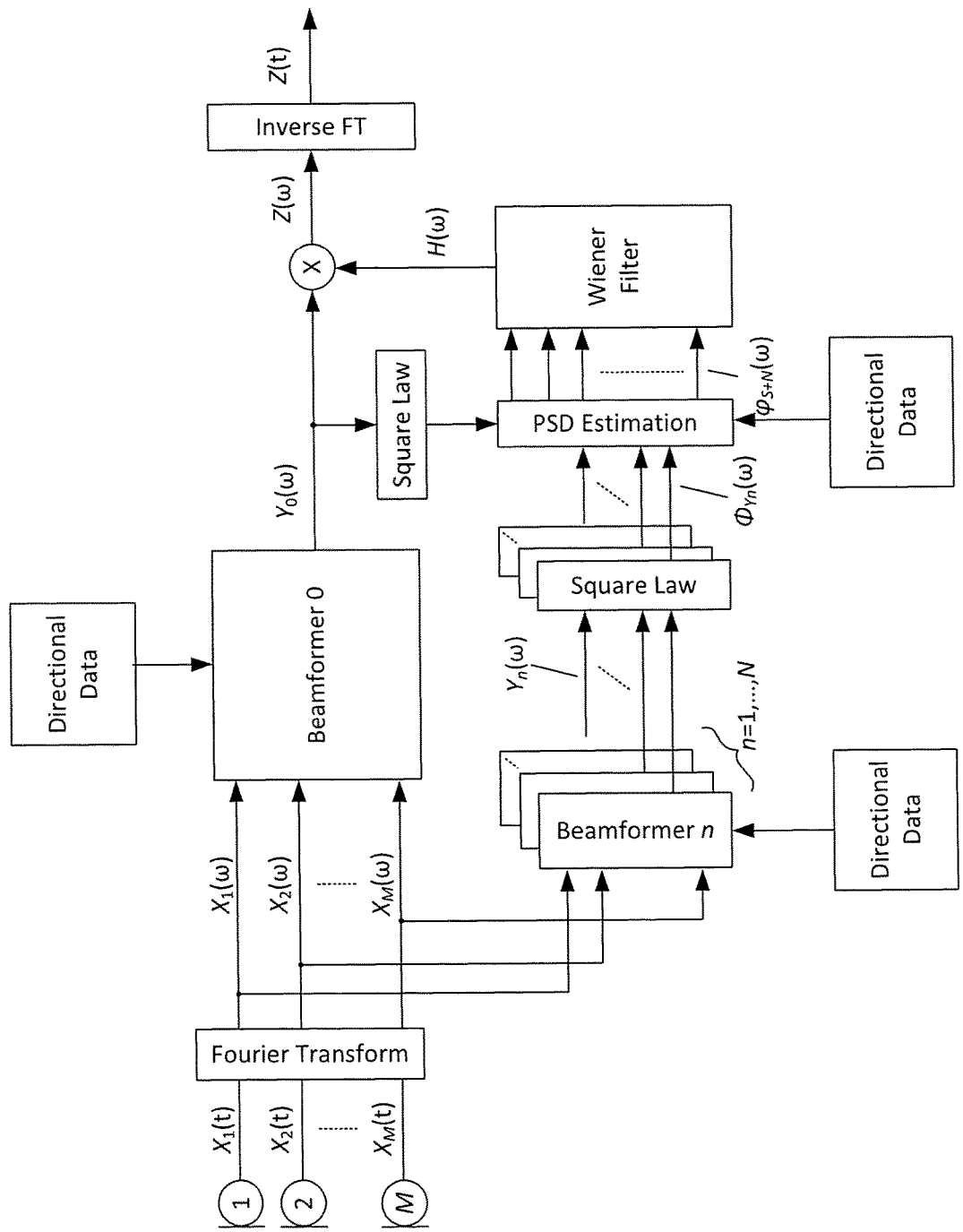
FIG. 9 a schematic diagram of noise filtering according to one embodiment.

FIG. 9 shows a schematic diagram of a method for producing filtered target audio Z(t) using a sound capturing device according to one embodiment. The sound capturing device includes an array of microphones (denoted 1, 2, . . . M), which each capture sound data in the time domain $X_1(t)$, $X_2(t)$, . . . $X_M(t)$. A Fourier transform is used to change the domain of the sound data to the frequency domain $X_1(\omega)$, $X_2(\omega)$, . . . $X_M(\omega)$.

The sound data $X_1(\omega)$, $X_2(\omega)$, . . . $X_M(\omega)$ is passed to Beamformer 0, which uses the directional data (for example, the directional data detected at step 702 or step 802, described above) to apply a suitable beamforming configuration so that the resulting target audio beam $Y_0(\omega)$ is directed towards the target audio source.

The sound data $X_1(\omega)$, $X_2(\omega)$, . . . $X_M(\omega)$ is also passed to beamformers n, which use the directional data (for example, the directional data detected at step 703 or step 803, described above) to apply a suitable beamforming configuration so that the resulting noise beam(s) $Y_n(\omega)$ is directed towards the noise source(s).

The target audio beam $Y_0(\omega)$ and noise beam $Y_n(\omega)$ are provided to a square law unit which calculates the energy magnitude per frequency bin for each beam. The resulting data is supplied to a PSD Estimation unit which estimates the PSD for each beam. This may be done using the Welch method. The Welch method relies on directivity data. The directivity data may be precalculated from impulse response system characterisation. The PSD Estimation unit uses directional data to select the appropriate data when estimating the PSD for each beam.

The PSD Estimation units produces weights, which are supplied to a suitable filter (such as a Wiener filter, as shown in FIG. 9), which produces filter H(ω) that is applied to the target audio beam $Y_0(\omega)$. An inverse Fourier transform converts to the time domain, producing the filtered target audio Z(t).

While the sound capturing device will continually capture sound data $X_1(t)$, $X_2(t)$, . . . $X_M(t)$, as the relative direction of the target source with respect to the noise changes (for example, due to a moving target source), new beamforming configurations and PSD estimations are applied, thereby improving the filtered target audio Z(t).

In embodiments where the sound capturing device is physically steerable with respect to the UAV, once Beamformer 0 has been applied, it may not be necessary to reconfigure the target audio beam. If the relative direction of the target audio source changes, the sound capturing device will be redirected so that the target audio beam continues to capture target audio. However, as the relative direction of the noise source(s) will have changed, new noise beam(s) will need to be implemented by Beamformer n.

Figure 10:
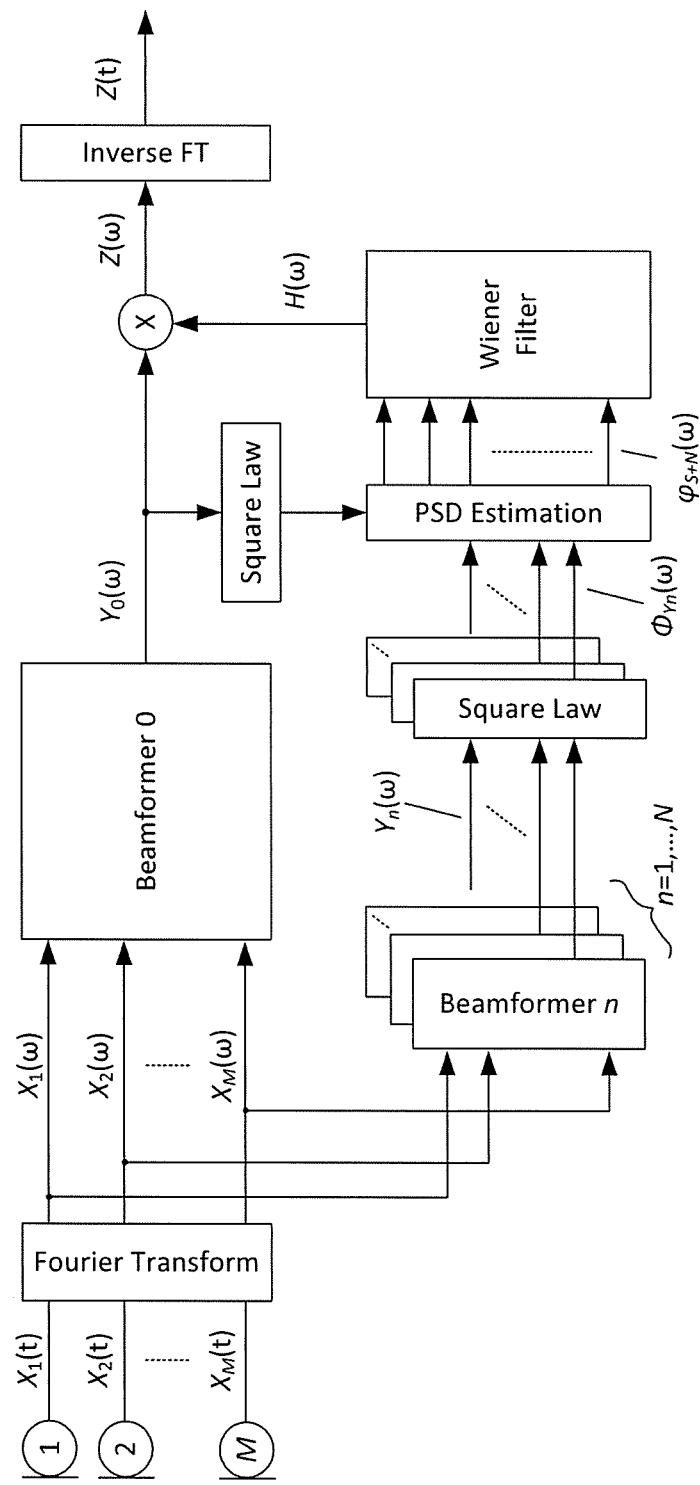
FIG. 10 a schematic diagram of noise filtering according to one embodiment.

FIG. 10 shows a schematic diagram of a method for producing filtered target audio Z(t) using a sound capturing device where the sound capturing device has the polar pattern described in relation to FIGS. 3a and 3b. Beamformer 0 produces the target audio beam (corresponding to the first lobe of sensitivity) and Beamformers n producer the noise beam n (corresponding to the second lobe of sensitivity). As the relative direction of the target audio source changes (for example, the target audio source moves), the direction of the sound capturing device is changed (for example, it may be mounted via a gimbal allowing it to be steered). The beams themselves do not need to change since the second lobe of sensitivity will capture the noise sources regardless of the direction. Also, since the noise beam has approximately uniform gain, the energy capture by the noise beam is largely immune to the relative position of the noise source. Therefore, using the array of FIGS. 3a and 3b may be simpler as it does not need to be regularly updated with new directional data.

In this case "directional data" may mean the spatial relationships of each element in the array forming the sound capture device to the noise sources. This may be used to calculate the beamformers for capturing the sound and noise sources prior to using the capture device.

Many noise filtering processes are based around having estimations of the noise mixed into the input audio, to filter only that noise out. This means the accuracy of that estimation is key to the actual performance of these processes.

In one instance of a noise filtering system that can be used with a gimbal-mounted microphone array, the system may receive spatially separated target sound and noise sources via 2 separate beamformers pointed towards those sources. While the beams themselves enact spatial filtering there is still leakage of non-target sound level into each beam. It is possible to use the known responses of each of the beams in known target directions of interest to obtain an estimation of what components of audio have originated from those directions:

$$PSD_{sources}(f,t) = G^{-1}(f) \times PSD_{beams}(f,t)$$

where $PSD_{beams}$ is the power spectral density (PSD)_ of the audio captured by each beam pointing in target sound and noise sources of interest, $G^{-1}$ is the inversed square matrix containing the gain of each beamformer in each of the directions of interest, and $PSD_{sources}$ is the estimated PSD of each of the different sources.

When the diagonal elements of the gain matrix G are small, the inverse operation performed on digital systems are prone to precision-level error, potentially degrading performance greatly. The severity of this error rises with the size of the gain matrix G, which gets larger with increasing number of beams used. This error can be alleviated with regularization:

$$G_{regularized} = G + R \times I$$

Where I is the identity matrix and R is the regularization factor. R is typically a small, arbitrary number selected to ensure the diagonal elements are not too small. However, regularization causes the matrix to no longer accurately represent the gain of the beamformers, so the performance of the noise filtering is still degraded accordingly. Generally, to meaningfully capture the noise sources relevant in a UAV system with narrow beams both 'sides' of motors must have their own dedicated beams in addition to the target sound source beam. In UAV frames with motors that are spatially located further apart, more beams may be needed, and the greater the degree of numerical error introduced.

By utilizing the wide null beam implementation which captures all non-target sources in one beam with near-invariant gain we can model all the noise input from this capture area as a single 'noise source' from one direction. In this model there is only two beams that capture two directions of interest, one of the target sound source and one of the 'noise source'. The G matrix that consists of the directivity of each beamformer in each signal direction of interest is thus reduced to a 2×2 matrix, minimizing the odds of precision error and also reducing the amount of regularization that needs to be done, if any. This may increase the accuracy of the resulting noise filtered output.

This reduction of the problem space also means the calculation load is reduced, making it more feasible in a real-time implementation on the UAV where power consumption is a significant design consideration.

Although the response is relatively angle- and frequency-invariant for the wider null beam for large angles, there is still a small degree of deviation from the ideal unity gain and it may improve the performance of noise filtering if the true response at a particular angle related to the primary noise source(s) is used. The telemetry of the drone and the gimbal may be used in some applications to select the appropriate gains to use in the G matrix for the current relative angle of the sound capture system to noise sources.

Figure 11:
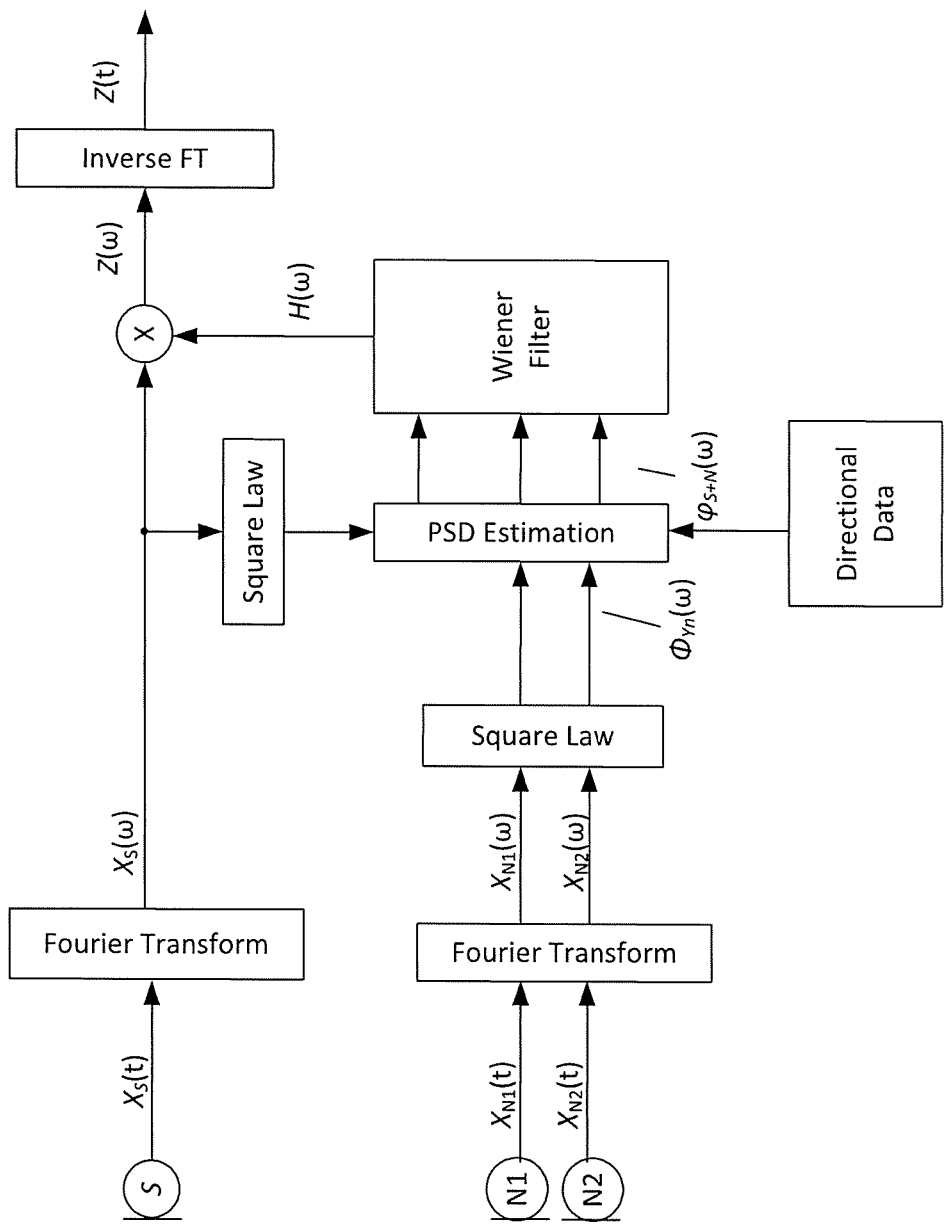
FIG. 11 a schematic diagram of noise filtering according to one embodiment.

FIG. 11 shows a schematic diagram of a method for producing filtered target audio Z(t) using distinct noise capturing devices (N1, N2) and a target audio capturing device (S). In this embodiment, there is no beamforming.

The target audio from the target audio capturing device is passed through a Fourier transform unit, to produce a target audio data in the frequency domain $X_S(\omega)$. The noise signal from noise capturing devices N1 and N2 is also passed through a Fourier transform unit, to produce noise audio data $X_{N1}(\omega)$ and $X_{N2}(\omega)$.

These are then passed through a Square Law unit, PSD Estimation unit and Wiener filter in much the same way as described in relation to FIG. 9, producing filtered target audio X(t).

The target audio capturing device may be steerable with respect to the UAV while the noise capturing devices may be fixed (for example, they may be permanently directed towards the motor and propeller assembly). Therefore the relative direction of the target audio signal may change, which information is supplied to the PSD Estimation unit.

Figure 12:
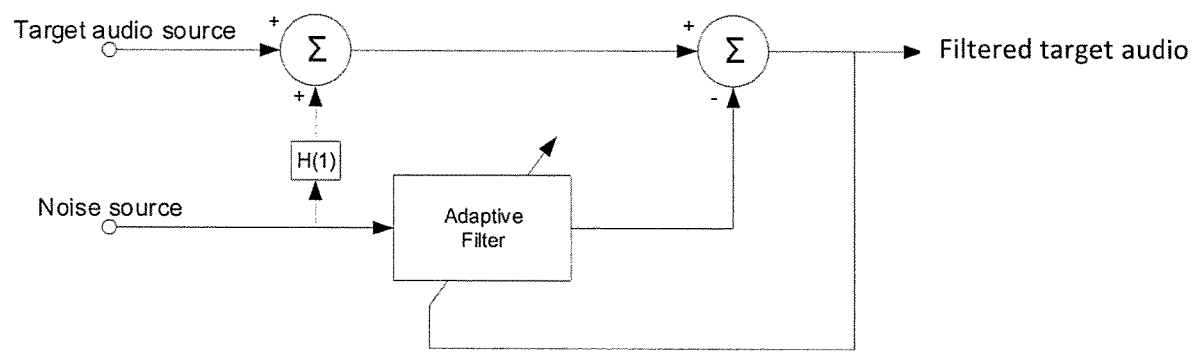
FIG. 12 a diagram of noise filtering according to one embodiment.

FIG. 12 shows a diagram of noise filtering according to one embodiment. This shows noise from a noise source being filtered out from target audio using an adaptive filter to produce a filtered target audio output.

Figure 13:
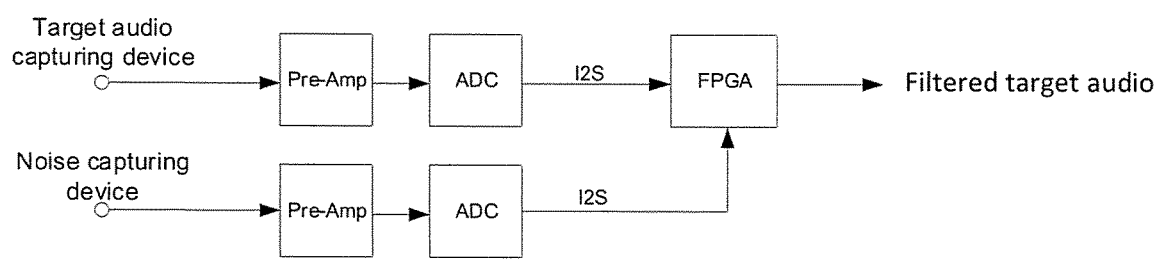
FIG. 13 a diagram of noise filtering according to one embodiment.

FIG. 13 shows a schematic diagram of noise filtering according to one embodiment. Noise and target audio are captured. The signals are pre-amplified and then digitized. Then noise is filtered out from the target audio. The filtered target audio may be stored/transmitted in digital and/or analogue format.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of noise filtering including:
   determining a beam forming pattern comprising a main beam and a null beam from an end fire sound capturing device mounted to a UAV;
   capturing noise data using the null beam;
   capturing target audio data using the main beam;
   filtering the noise data from the target audio data; and
   outputting filtered target audio.

2. The method of claim 1 wherein the null beam captures all of the significant noise sources.

3. The method of claim 1 wherein the null beam has a beam width of at least 180°.

4. The method of claim 1 wherein the null beam has a beam width of 360°–X°, where X is the beam width of the main beam.

5. The method of claim 1 wherein the null beam has a gain which varies by less than 20% across it's beam width.

6. The method of claim 1 wherein the null beam has a gain and a gain and a frequency range, defined by a lower frequency, where the gain varies by less than 20% at the lower frequency.

7. The method of claim 1 wherein filtering the noise data from the target audio data uses a 2×2 gain matrix, which characterises a gain of the main beam in the forward direction and reverse direction, and the null beam in the forward direction and reverse direction.

8. A gimbalised microphone configured to use the method of claim 1.

9. The gimbalised microphone of claim 8, wherein the microphone is a MEMS array.

10. The gimbalised microphone of claim 8, wherein the microphone is an end-fire line microphone array.

11. The gimbalised microphone of claim 8 further comprising
   one or more sensors to detect directional data corresponding to relative directions of the gimbalised microphone and a mounting to a unmanned aerial vehicle (UAV); and
   a processing unit configured to use the directional data to filter the noise data from the target audio data.

* * * * *